United States Patent [19]
Koden et al.

[11] Patent Number: 5,644,371
[45] Date of Patent: Jul. 1, 1997

[54] LIQUID CRYSTAL DISPLAY DEVICE AND METHOD FOR PRODUCING THE SAME

[75] Inventors: Mitsuhiro Koden, Nara; Aya Miyazaki, Tenri; Tokihiko Shinomiya, Nara, all of Japan

[73] Assignee: Sharp Kabushiki Kaisha, Osaka, Japan

[21] Appl. No.: 434,487

[22] Filed: May 4, 1995

[30] Foreign Application Priority Data

Jul. 25, 1994 [JP] Japan ................................... 6-172738

[51] Int. Cl.$^6$ ........................... G02F 1/1339; G02F 1/141
[52] U.S. Cl. ........................ 349/110; 349/134; 349/156; 349/172; 349/187
[58] Field of Search .................... 359/54, 56, 67, 359/81, 100; 349/110, 92, 93, 133, 134, 155, 156, 172, 187, 189, 188

[56] References Cited

U.S. PATENT DOCUMENTS

| | | | |
|---|---|---|---|
| 5,138,473 | 8/1992 | Dijon et al. | 359/81 |
| 5,347,381 | 9/1994 | Shinomiya et al. | 359/100 |
| 5,404,237 | 4/1995 | Katsuse et al. | 359/100 |
| 5,453,861 | 9/1995 | Shinjo et al. | 359/100 |

FOREIGN PATENT DOCUMENTS

| | | |
|---|---|---|
| 59-201021 | 11/1984 | Japan . |
| 3-192334 | 8/1991 | Japan . |
| 6-301015 | 10/1994 | Japan . |
| 6-308500 | 11/1994 | Japan . |
| 6-347765 | 12/1994 | Japan . |

OTHER PUBLICATIONS

N.A. Clark et al., *Appl. Phys. Lett.*, vol. 36, No. 11, pp. 889–901, 1980 "Submicrosecond bistable electro–optic switching in liquid crystals".

N. Wakita et al., *Abstracts of 4th International Conference on Ferroelectric Liquid Crytals*, pp. 367–368, 1993 "Shock–Problem Free FLCD and Mechanism of Alignment Destruction By Mechanical Shock".

M. Koden et al., *JPN. J. Appl.Phys.*, vol. 31, pp. 3632–3635, 1992, "Four States of Surface–Stabilized Ferroelectric Liquid Crystal with Parallel Rubbing".

*Primary Examiner*—William L. Sikes
*Assistant Examiner*—Tai V. Duong
*Attorney, Agent, or Firm*—David G. Conlin; George W. Neuner

[57] ABSTRACT

A liquid crystal display device includes a ferroelectric liquid crystal layer. The ferroelectric liquid crystal molecules have pretilt directions defined by first direction vectors obtained by orthogonally projecting first imaginary vectors to each surface of a pair of substrates. The first imaginary vectors are parallel to the liquid crystal molecules in the ferroelectric liquid crystal layer in the vicinity of the substrates and directed away from each surface of the pair of substrates toward a center portion of the ferroelectric liquid crystal layer in its thickness direction. The ferroelectric liquid crystal layer has a chevron layered structure. A bending direction of the smectic layers is the same direction as the first direction vector obtained by orthogonally projecting a second imaginary vector to the substrates. The second imaginary vector is parallel to the smectic layers and is included in the same plane with the first imaginary vector and is directed away from the substrates toward the center of the ferroelectric liquid crystal layer. Walls made of insulating non-liquid crystal material are formed between the pair of substrates in a direction perpendicular to the surfaces of the pair of substrates and a light-shielding film is formed on either one of the substrates so that light does not pass through portions of the ferroelectric liquid crystal in a vicinity of a downstream side of the walls along the pretilt direction.

3 Claims, 9 Drawing Sheets

C1U orientation

C2U orientation

← Pretilt direction

LIQUID CRYSTAL DISPLAY DEVICE AND METHOD FOR PRODUCING THE SAME

BACKGROUND OF THE INVENTION

1. Field of the Invention

The present invention relates to a liquid crystal display device (LCD) using ferroelectric liquid crystal as a display medium, and a method for producing the same.

2. Description of the Related Art

An LCD of the type using the ferroelectric liquid crystal (FLC) generally utilizes a so-called chiral smectic C phase (Sc*), one kind of liquid crystal phases. In this liquid crystal phase, the orientation of the liquid crystal molecules is a helical one in a bulk state. However, if the liquid crystal material in such a phase is injected into a liquid crystal cell in which a distance between a pair of substrates is shorter than the helical pitch of the liquid crystal material, then the helical structure of the liquid crystal material is deformed. As a result, as shown in FIGS. 9(a) and 9(b), a plurality of smectic layers 101 are stacked in parallel, and the liquid crystal molecules 100 are tilted with respect to the smectic layers 101.

In this liquid crystal phase, bistable states as shown in FIGS. 9(a) and 9(b) are caused upon the application of an electric field. This is because the ferroelectric liquid crystal molecule has a spontaneous polarization (Ps) in a direction vertical to the paper sheet, and therefore, if applying an electric field (E) in the direction of the polarization, then the liquid crystal molecules 100 are reoriented so that the direction of the spontaneous polarization is aligned with the direction of the electric field (E).

By sandwiching the liquid crystal cell including such a liquid crystal material with a pair of polarizing plates, i.e., a polarizer and an analyzer, two kinds of displays, i.e., a display in a bright state shown in FIG. 9(a) and a display in a dark state shown in FIG. 9(b), may be selectively conducted (cf. N. A. Clark and S. T. Lagerwall, Appl. Phys. Lett., 36, 899 (1980)).

Since the two kinds of states shown in FIGS. 9(a) and 9(b) are switched because of a direct interaction between an electric field and a spontaneous polarization, if the application direction of the electric field is changed, then a fast response may be realized in the order of microseconds. In addition, the ferroelectric liquid crystal has a so-called memory characteristic. That is to say, even after the applied electric field is removed, the ferroelectric liquid crystal molecules maintain the orientation of the state prior to removing the electric field. Therefore, by utilizing the fast response characteristic and the memory characteristic, the content to be displayed may be written into each scanning line at a high speed, thereby realizing a large capacity display by a simple matrix driving.

FIG. 10A shows a fundamental structure of an FLCD using the ferroelectric liquid crystal. This FLCD includes: a pair of glass substrates 101; a pair of electrodes 102 made of indium tin oxide (ITO) formed on the pair of substrates 101, respectively; a pair of insulating films 103 formed on the electrodes 102; and a pair of alignment films 104 formed on the insulating films 103. The alignment films 104 are generally made of a polymer material such as polyimide, and the surface of the films 104 are subjected to a rubbing treatment. The pair of substrates 101 having the above-described electrodes and films thereon are attached to each other so that the cell gap is approximately 1.5 μm. Then, a liquid crystal material is injected into the gap between the pair of substrates 101 so as to form a liquid crystal layer 105, and the peripheral portions thereof are sealed with a sealing member 106. Thereafter, a pair of polarizing plates, e.g., an analyzer 107 on the upper side and a polarizer 108 on the other lower side, are placed so as to sandwich the liquid crystal cell thus constructed, and drivers (not shown) are connected to the respective electrodes 102.

The ferroelectric liquid crystal display device having the above-described construction as shown in FIG. 10A is almost the same as a simple-matrix type liquid crystal display device as shown in FIG. 10B except that the cell gap of the FLCD of FIG. 10A is as small as 1.5 μm, and that the liquid crystal layer 105 of the FLCD of FIG. 10A is constituted by the ferroelectric liquid crystal material. In these FIGS. 10A and 10B, the same reference numerals denote the same components. In FIG. 10B, the reference numeral 105a denotes a liquid crystal layer constituted by a non-ferroelectric liquid crystal material.

The above-mentioned FLCD using a ferroelectric liquid crystal material has a problem in that the FLCD has a poor resistance to a mechanical shock or a pressure (cf. N. Wakita et al., Abstr. 4th International Conference on Ferroelectric Liquid Crystals, 367 (1993)). The cause of the problem is understood as follows. If applying a pressure or a mechanical shock to the FLCD, the liquid crystal molecules in the ferroelectric liquid crystal layer are forced to flow, so that an initial orientation of the liquid crystal molecule is destroyed never to be naturally recovered.

In order to increase the shock resistance, it is considered necessary to prevent a flow of the liquid crystal molecules from being generated inside the ferroelectric liquid crystal cell because of the shock applied thereto. According to an exemplary method, as shown in FIG. 11, walls 110 are provided between the pair of substrates 101. In FIG. 11, the same components as those in FIGS. 10A and 10B are denoted by the same reference numerals. Various techniques are employed for producing the walls 110. For example, Japanese Laid-Open Patent Publication No. 59-201021 discloses a technique for producing the walls with spacers. Japanese Laid-Open Patent Publication No. 3-192334 discloses a technique for producing the walls by using partition members. Moreover, Japanese Laid-Open Patent Publication No. 6-301015 discloses a technique for forming photopolymerizable polymer walls in a liquid crystal layer by injecting a mixture containing a photopolymerizable resin and a liquid crystal material and then by irradiating the mixture through a photomask with UV rays.

However, if the walls are formed inside a ferroelectric liquid crystal layer, orientational defects are likely to occur in the vicinity of the walls, so that the resulting display quality is degraded because of the effects of the orientational defects.

In order to solve such a problem, as shown in FIG. 12, it is possible to cover the disclination portions in the vicinity of the walls 110 with a light-shielding layer 111. For example, Japanese Laid-Open Patent Publication Nos. 6-347765 and 6-308500 disclose a technique for providing a light-shielding layer for a ferroelectric liquid crystal display device in which the walls are formed. But, in these cases the area of display portions 112, which are not covered with the light-shielding film 111, for contributing to display is reduced by providing the light-shielding film 111, so that the aperture ratio is reduced and the resulting display becomes disadvantageously dark. Also, these patent publications do not disclose a method for controlling the positions where the orientational defects occur.

SUMMARY OF THE INVENTION

The liquid crystal display device of this invention, includes: a pair of substrates disposed so as to face each other; a pair of electrodes formed respectively on each surface of the pair of substrates; a pair of alignment films formed respectively on each surface of the pair of electrodes; and a ferroelectric liquid crystal layer interposed between the pair of alignment films, wherein pretilt directions defined by first direction vectors obtained by orthogonally projecting first imaginary vectors to each surface of the pair of substrates are the same with respect to both of the pair of substrates, the first imaginary vectors are parallel to liquid crystal molecules in the ferroelectric liquid crystal layer in the vicinity of the pair of substrates and directed away from each surface of the pair of substrates toward a center portion of the ferroelectric liquid crystal layer in its thickness direction, wherein the ferroelectric liquid crystal layer has a plurality of smectic layers in a chevron layered structure and where a bending direction of the smectic layers is the same direction as the first direction vector and is defined by a second direction vector obtained by orthogonally projecting a second imaginary vector to each surface of the pair of substrates, the second imaginary vector is parallel to the smectic layers and included in the same plane with the first imaginary vector and directed away from each of the surfaces of the pair of the substrates toward the center portion of the ferroelectric liquid crystal layer, and wherein walls made of an insulating non-liquid crystal material are formed between the pair of substrates in a direction vertical to the surfaces of the pair of substrates, and a light-shielding film is formed on either one of the pair of substrates so that light beam does not pass through portions of the ferroelectric liquid crystal in a vicinity of a downstream side of the walls along the pretilt direction.

In one embodiment of the invention, a liquid crystal material of the ferroelectric liquid crystal layer has a negative dielectric anisotropy and shows minimal values in a voltage-memory pulse width curve.

In one embodiment of the invention, the alignment films are organic polymer films, to which pretilt angles are applied by conducting a rubbing treatment.

In another aspect of the invention, the method for producing the liquid crystal display device includes the steps of:

injecting a mixture containing a photopolymerizable monomer and a ferroelectric liquid crystal material into a gap between a pair of substrates disposed so as face each other; and irradiating the mixture with light through a photomask having a predetermined opening pattern, thereby forming insulating polymer walls within light-irradiated portions.

Thus, the invention described herein makes possible the advantage of providing a ferroelectric liquid crystal display device which is excellent in the shock resistance and may suppress the reduction of an aperture ratio to a minimal level by controlling the positions where the orientational defect is generated and by forming a light-shielding film only on the portions having such defect; and a method for producing such a ferroelectric liquid crystal display device.

This and other advantages of the present invention will become apparent to those skilled in the art upon reading and understanding the following detailed description with reference to the accompanying figures.

BRIEF DESCRIPTION OF THE DRAWINGS

FIG. 1A is a view showing a book-shelf structure. FIG. 1B is a view showing the chevron layered structure.

DESCRIPTION OF THE PREFERRED EMBODIMENTS

Hereinafter, the present invention will be described by way of illustrative examples with reference to the accompanying drawings.

Figure 1A:
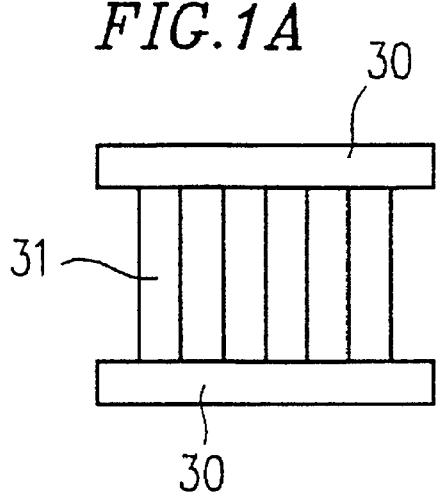
FIGS. 1A and 1B are schematic cross-sectional views illustrating a structure of the smectic layers in a ferroelectric liquid crystal.
Figure 1B:
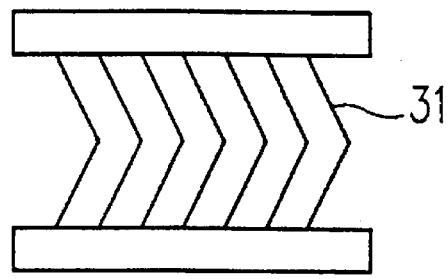
Figure 2A:
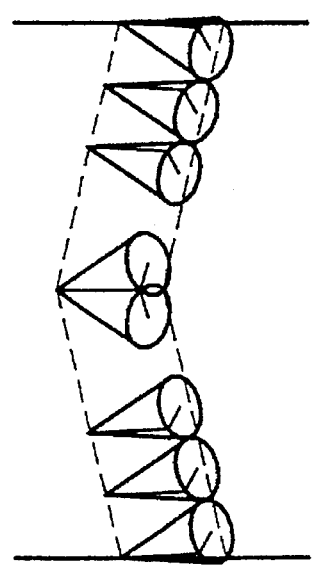
FIG. 2A is schematic view illustrating a C1U orientation in a ferroelectric liquid crystal display device.
Figure 2B:
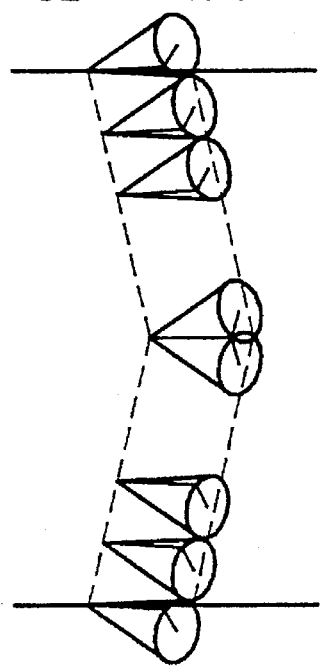
FIG. 2B is schematic view illustrating a C2U orientation in a ferroelectric liquid crystal display device.

When a liquid crystal display device using a ferroelectric liquid crystal material was proposed for the first time, the structure of smectic layers in the liquid crystal layer was considered to be a so-called "bookshelf structure", that is to say, as shown in FIG. 1A, a plurality of smectic layers 31 existed in a direction vertical to the surfaces of the substrates 30 (the stacking direction of the smectic layers 31 was parallel to the surfaces of the substrates 30). However, according to posterior research, it was found that the smectic layers 31 are arranged in a so-called "chevron layered structure", that is to say, the layers 31 bend at center portions between the pair of substrates in a shape of "V", as shown in Figure B. The present inventors reported that four kinds of orientational states, i.e., C1U (C1-uniform), C1T, C2U and C2T exist depending on the difference in the molecular orientations inside the chevron layered structure in a ferroelectric liquid crystal display device of which opposed substrates have pretilt angles in an identical direction (see M. Koden et al., Jpn. Appl. Phys., 31, 3632 (1992)). The orientational states C1 and C2 are determined by the direction of the pretilt angle and the direction of the chevron layer (the bending direction of the smectic layers). FIGS. 2A and 2B respectively show the models of the molecular orientational states C1U and C2U, which are two practically important states of the above-mentioned four orientational states.

In the orientational state C2U as shown in FIG. 2B, when the dielectric anisotropy ($\Delta\epsilon$) is positive or around zero, a bias voltage causes a large fluctuation in the molecular orientation, so that a high contrast can not be obtained. On the other hand, when using a particular $\tau$-$V_{min}$ characteristic, the relationship between a pulse voltage (V) and the width $\tau$ of a memory pulse (μsec), shown by a ferroelectric liquid crystal material having a negative dielectric anisotropy ($\Delta\epsilon<0$); an AC stabilizing effect, that is to say, the effect of the alternating electric field for making the orientation direction of the liquid crystal molecules parallel to the substrates, enables a high contrast.

Figure 3:
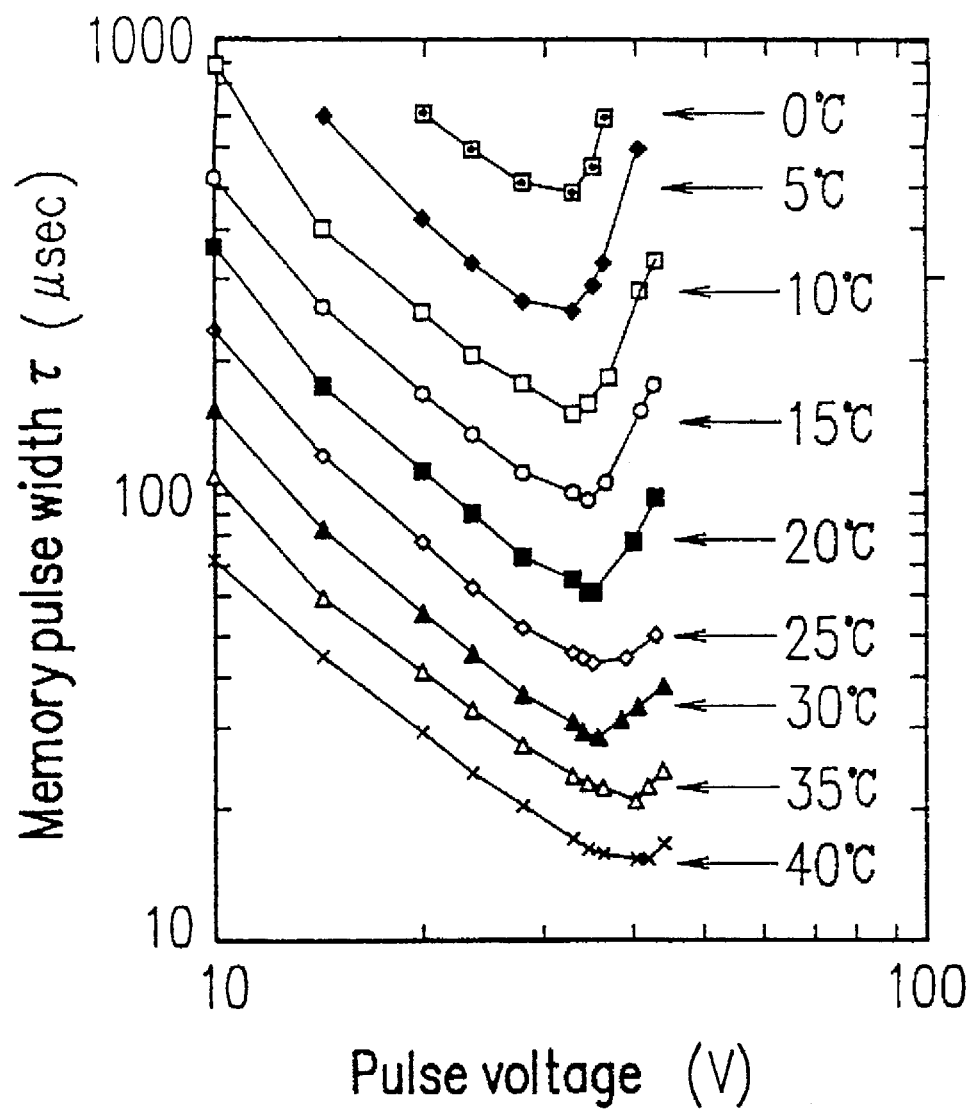
FIG. 3 is a graph showing an exemplary $\tau$-$V_{min}$ characteristic of a ferroelectric liquid crystal material having a negative dielectric anisotropy.

In a common ferroelectric liquid crystal material; as a voltage to be applied to the liquid crystal layer is increased, the response speed of the liquid crystal molecules in the layer is monotonously accelerated. However, in the case where the dielectric anisotropy is negative and the spontaneous polarization is not so large, as shown in FIG. 3, minimal values appear in the curve ($\tau$-$V_{min}$ characteristic) showing the relationship between a pulse voltage (V) and the width $\tau$ of a memory pulse (μsec) at respective temperatures. This phenomenon is caused by a large effect of the dielectric anisotropy, as shown in FIGS. 2A and 2B, to be obtained when the effective value of the voltage becomes large. In other words, this phenomenon is caused by the above-mentioned AC stabilizing effect.

In general, if comparing a C1 orientation and a C2 orientation, the C1 orientation appears at a higher temperature, while the C2 orientation becomes stabler as the temperature decreases. Moreover, a C1U orientation is likely to be transformed into the C2 orientation or a C1T orientation by the variation of the temperature or the application of voltages. Therefore, a C2U orientation may be regarded as an orientational state useful for securing a wide operational temperature range. Also, a faster response speed and a more satisfactory memory characteristic may be obtained in the C2U orientation than in the C1U orientation. Consequently, a display mode where the liquid crystal molecules are oriented in the C2U state by using the above-mentioned $\tau$-$V_{min}$ characteristic having the minimal values may be regarded as a mode excellent in a fast writing speed, a high contrast, a wide operational temperature range and the like.

Figure 11:
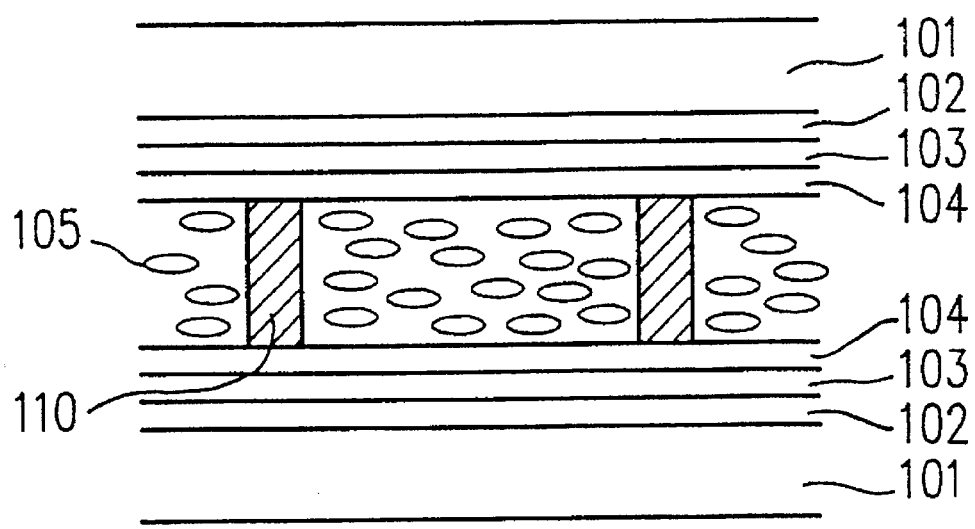
FIG. 11 is a cross-sectional view showing a conventional ferroelectric liquid crystal display device having walls.
Figure 12:
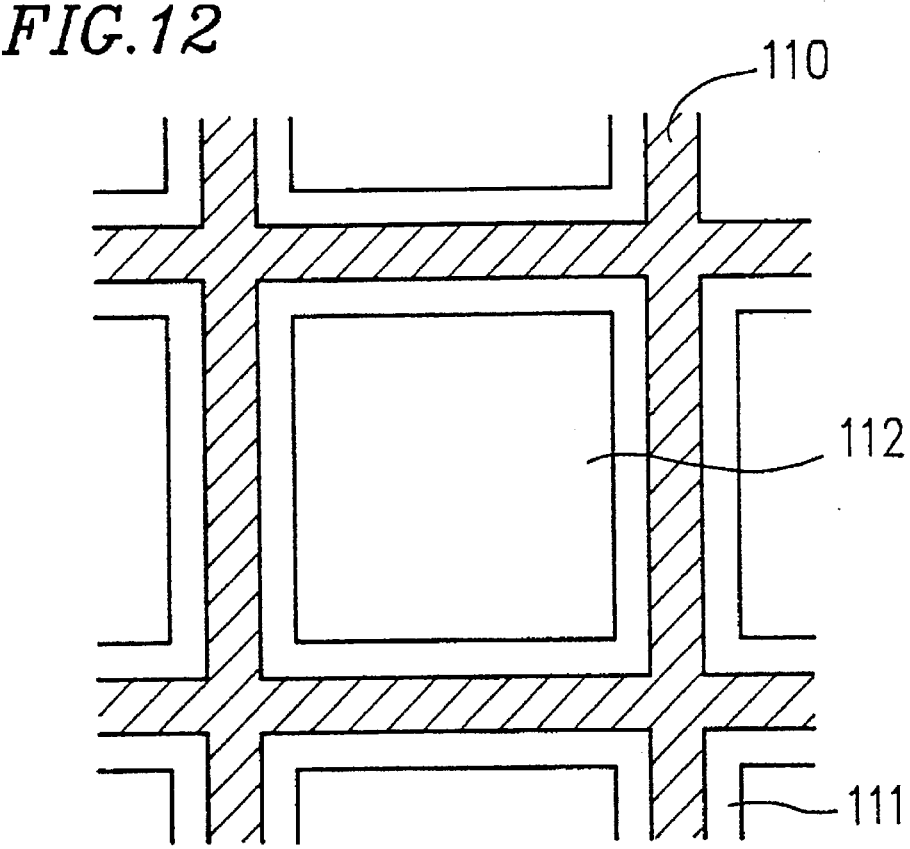
FIG. 12 is a plan view showing a conventional ferroelectric liquid crystal display device having walls.

In order to increase the shock resistance, it is considered necessary to prevent the liquid crystal molecules from flowing inside a ferroelectric liquid crystal cell because of the shock to be applied thereto. One exemplary method is to provide the walls in the gap between a pair of substrates, as shown in FIG. 11.

Figure 4A:
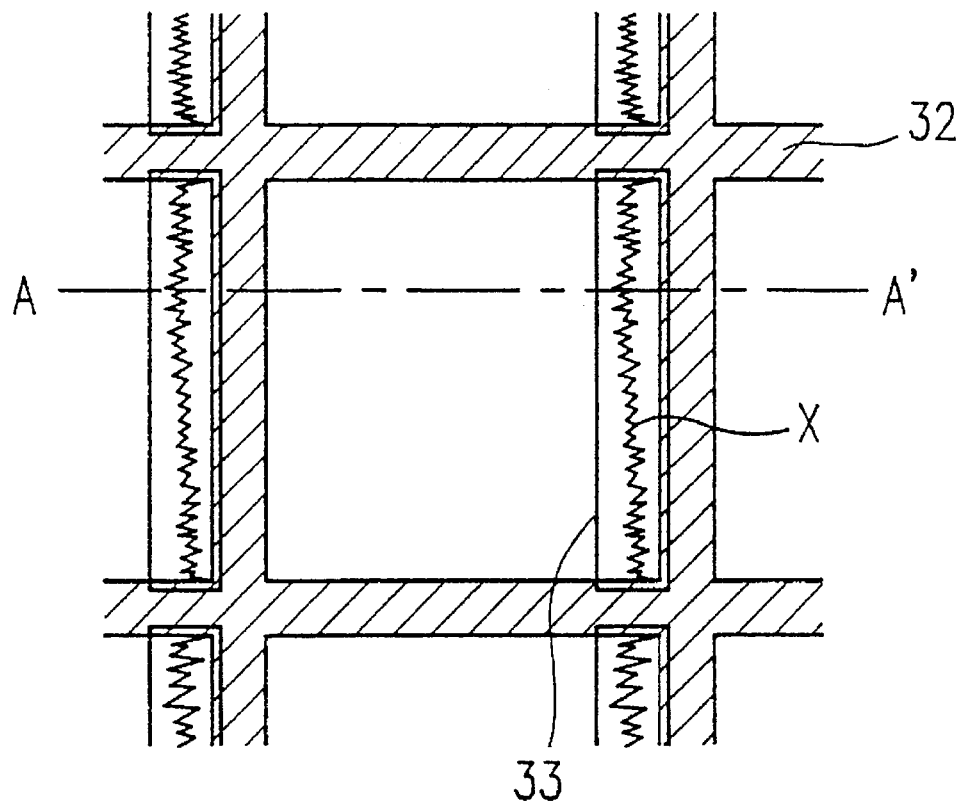
FIG. 4A is a schematic plan view showing the structure of the walls and the defects generated in a ferroelectric liquid crystal display device having a C2U orientation.
Figure 4B:
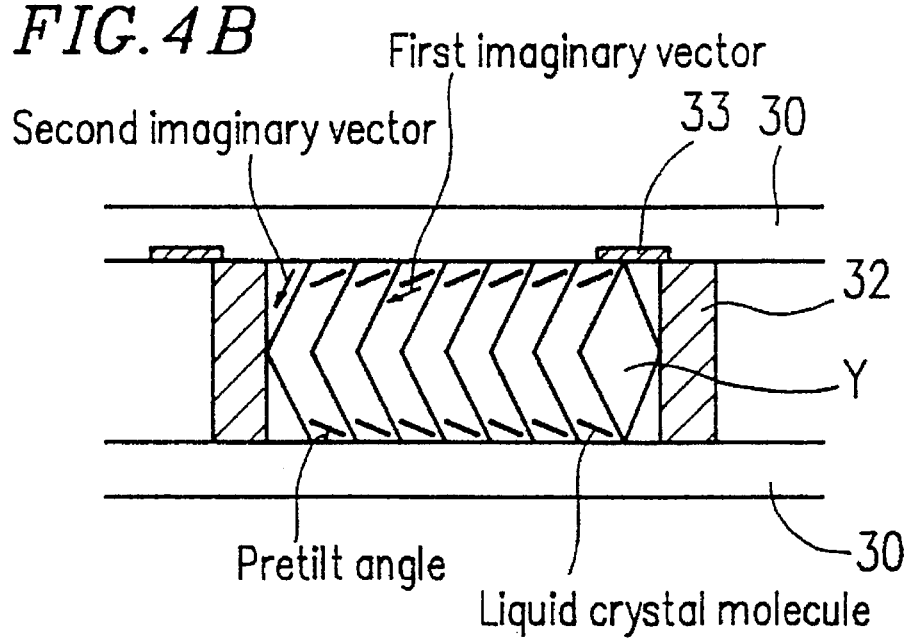
FIG. 4B is a schematic cross-sectional view taken along the line A—A' in FIG. 4A showing the structure of the walls and the defects generated in a ferroelectric liquid crystal display device having a C2U orientation.

The present inventors found that an orientational defect is likely to occur in the vicinity of the walls and that a zigzag defect (or a lightning defect) X is generated in one particular direction if the liquid crystal molecules are oriented in a C2U state as shown in FIG. 4A. FIG. 4A is a schematic plan view, while FIG. 4B is a cross-sectional view taken along the line A—A' in FIG. 4A (the orientational state in these figures is C2U). In FIG. 4B, transparent electrodes, insulating films, alignment films and the like are not shown.

As will be understood from FIGS. 4A and 4B, the zigzag defect X is generated on the forward side of the walls 32 along the pretilt direction. The relationship between this zigzag defect X and the structure of the smectic layers in the ferroelectric liquid crystal is already elucidated. According to the elucidated principles, as shown in FIG. 4B, it is presumed that the smectic layers have a diamond-shaped layer Y in the vicinity of the wall 32 in the zigzag defect portions X shown in FIG. 4A. The shape of the layer Y is determined by the existence of the walls 32. In other words, such a structure of the smectic layers causes a zigzag defect X.

Therefore, according to the present invention, the light-shielding layer is not formed in the portions where there is no influence of the walls and the liquid crystal molecules are oriented in a C2U state, whereas the light-shielding layers 33 are provided only in the portions in the vicinity of the walls 32 where the zigzag defects X are generated. As a result, the reduction of the aperture ratio may be suppressed to a minimal level. In addition, the existence of the walls may improve the shock resistance.

Moreover, according to the present invention, a satisfactory orientational state may be realized in the display portion. In a common ferroelectric liquid crystal cell, various defects such as a zigzag defect are likely to occur inside the pixels. However, if walls are formed as shown in FIGS. 4A and 4B, then the zigzag defects X tend to be generated in the vicinity of the walls and the defects are unlikely to be generated in the other portions. This is probably because the strain of the structure of the smectic layers is removed by the occurrence of the zigzag defects in the vicinity of the walls. According to the present invention, the light-shielding film is provided in the zigzag defect portions in the vicinity of the walls. As a result, a satisfactory orientation without any defect may be obtained in the display portion.

A liquid crystal display device according to the present invention has the following structure. As shown in FIGS. 4A and 4B, the pretilt directions are the same with respect to both substrates 30. The pretilt direction is defined by a first direction vector obtained by orthogonally projecting a first imaginary vector to the surface of the substrate 30. The first direction vector is parallel to the liquid crystal molecules in the vicinity of the substrate 30 and directed away from the surface of the substrate 30 toward the center portion between the pair of substrates 30 (around the center of the display medium in the thickness direction). In addition, the bending direction of the smectic layers is the same direction as the first direction vector and is defined by a second direction vector obtained by orthogonally projecting a second imaginary vector to the surface of the substrate 30. The second imaginary vector is parallel to the smectic layer of the ferroelectric liquid crystal having the chevron layered structure, included in the same plane with the first imaginary vector and directed away from the surface of the substrate 30 toward the center portion between the pair of substrates 30.

Moreover, according to the present invention, in order to obtain a uniform C2U orientation, it is necessary to apply pretilt angles to the liquid crystal molecules with respect to the alignment films. In general, a pretilt angle, e.g., an intermediate angle in the range of three to eight degrees, is preferably used. Various methods such as an oblique evaporation method and a rubbing method may be used to apply the pretilt angles.

The walls may be produced in the following manner. First, a polymer film such as a polyimide film, a photoresist film, or an inorganic insulating film such as an $SiO_2$ film is formed. Thereafter, the walls may be formed by patterning the polymer films or the inorganic insulating film.

Figure 5A:
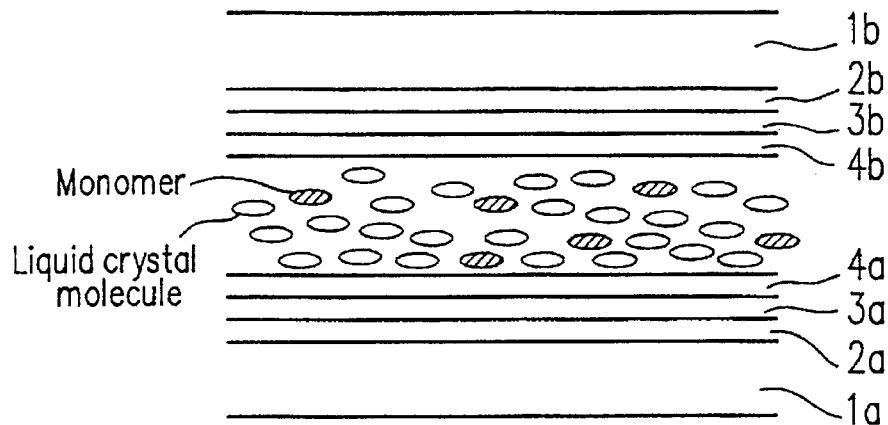
FIGS. 5A to 5C are cross-sectional views illustrating a method for producing the walls according to an example of the present invention.
Figure 5B:
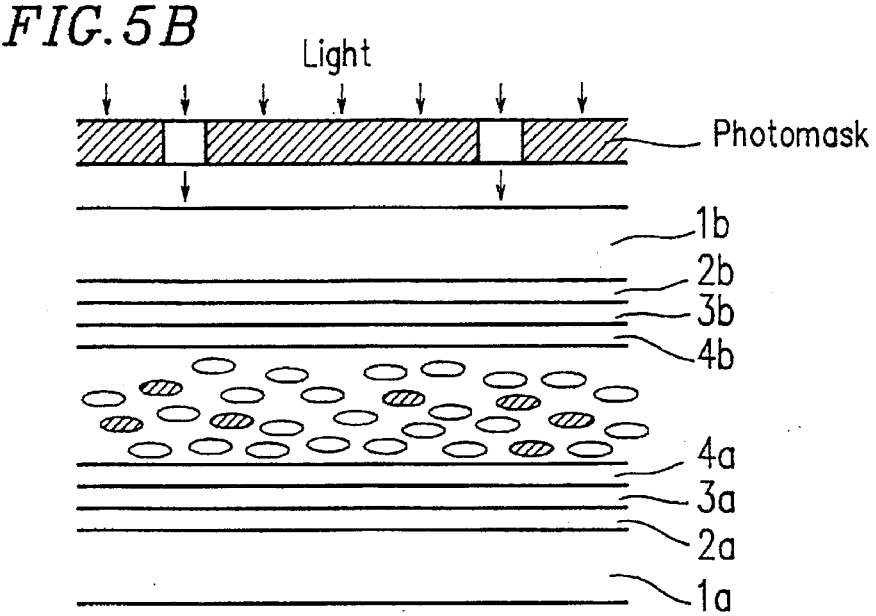
Figure 5C:
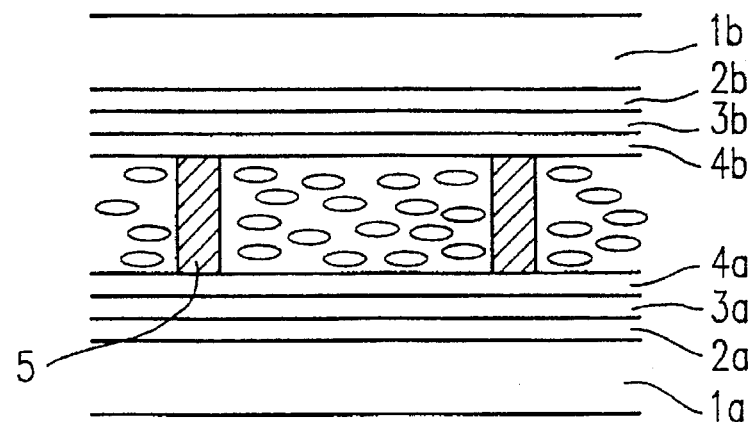

Another possible method is shown in FIGS. 5A to 5C. First, as shown in FIG. 5A, a mixture containing at least a ferroelectric liquid crystal material and a photopolymerizable monomer is sandwiched by a pair of substrates 1a and 1b disposed so as to face each other. In this case, the mixture may be included into the gap by using a method in which the mixture is injected through a part of the end portion of the ferroelectric liquid crystal cell, or a method in which the mixture is directly sandwiched by a pair of substrates. A polymerization initiator, a surfactant or the like may be further added to the mixture. Next, as shown in FIG. 5B, the mixture is irradiated with light through a photomask. As a result, as shown in FIG. 5C, non-liquid crystal material regions, i.e., the walls 5, are formed in the portions irradiated with the light, and the ferroelectric liquid crystal material for display remains in the portions which are not irradiated with the light. In FIGS. 5A to 5C, the reference numerals 2a and 2b are transparent electrodes; 3a and 3b are insulating films; and 4a and 4b are alignment films.

According to the present invention, the walls may be provided so as to surround the one, two, three or four sides of each pixel. In any case, it is necessary to provide a light-shielding film on the forward side of the walls along the pretilt direction.

The light-shielding film may be made of an opaque metallic film, a black matrix film or the like. In the case of using a metallic film, the electric resistance of wirings may be advantageously reduced in addition to the above-mentioned effects.

EXAMPLE 1

Figure 6:
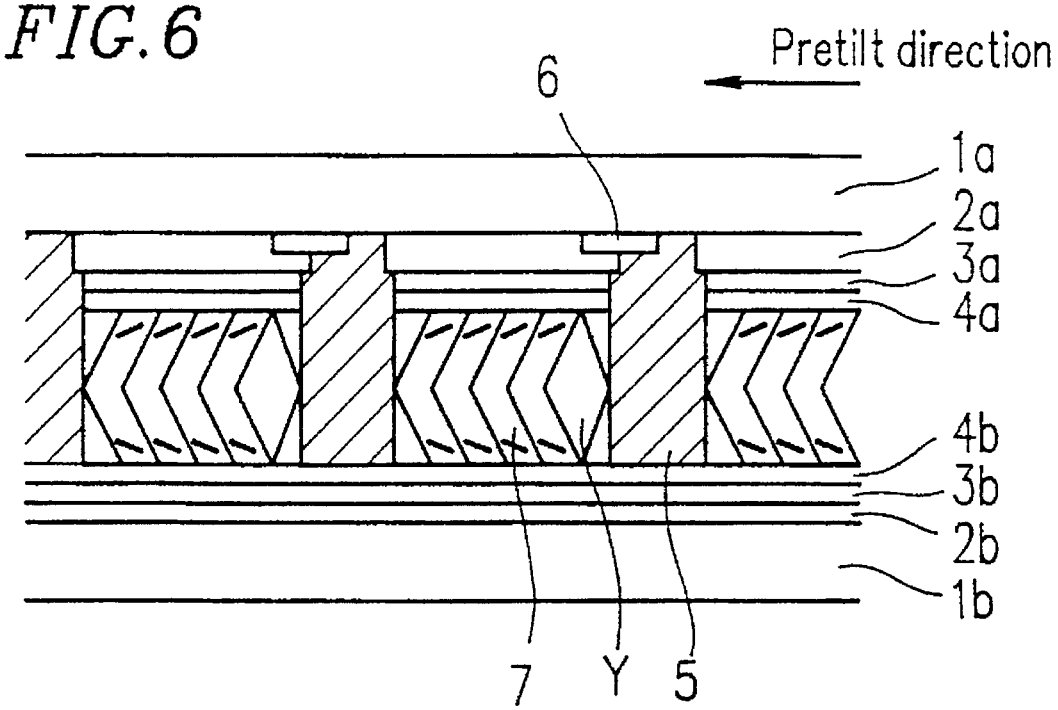
FIG. 6 is a cross-sectional view showing a ferroelectric liquid crystal display device according to the example of the present invention.

FIG. 6 is a cross-sectional view showing a ferroelectric liquid crystal display device according to a first example of the invention. This liquid crystal display device includes a ferroelectric liquid crystal layer 7 in the gap between a pair of substrates 1a and 1b disposed so as to face each other. On the surface of one of the substrates which faces the liquid crystal layer 7, i.e., on the surface of the upper substrate 1a, a transparent electrode 2a, an insulating film 3a and an alignment film 4a are formed in this order. On the surface of the other substrate 1b which faces the liquid crystal layer 7, a transparent electrode 2b, an insulating film 3b and an alignment film 4b are formed in this order.

The liquid crystal molecules in the vicinity of the substrates 1a and 1b are oriented at a pretilt angle with respect to their nearest respective substrates 1a or 1b. This orientation is realized by subjecting the alignment films 4a and 4b to a rubbing treatment. The pretilt directions of the liquid crystal molecules in the vicinity of the substrates 1a and 1b are the same. The pretilt direction is defined by the first direction vector obtained by orthogonally projecting a first imaginary vector to the surface of the substrate 1a or 1b. The first imaginary vector is parallel to the liquid crystal molecules in the vicinity of the substrate 1a or 1b and directed away from the surface of the substrate 1a or 1b toward the center portion of the liquid crystal layer in the thickness direction.

In addition, the ferroelectric liquid crystal layer 7 has a plurality of smectic layers in a chevron layered structure. The bending direction of the smectic layers is the same as the pretilt direction. The bending direction of the smectic layers is defined by the second direction vector obtained by orthogonally projecting a second imaginary vector to the surface of the substrate 1a or 1b. The second imaginary vector is parallel to the smectic layers, included in the same plane with the first imaginary vector and directed away from the surface of the substrate 1a or 1b toward the center portion of the liquid crystal layer.

The walls 5 made of a non-liquid crystal material are formed in the gap between the pair of substrates 1a and 1b so as to cross the surfaces of the substrates 1a and 1b at a right angle. These walls 5 are formed so as to surround the four sides of pixels defined in the opposed portions of the transparent electrodes 2a and 2b, so that an identical wall 5 exists on the interface between two adjacent pixels. A light-shielding film 6 is provided between the substrate 1a and the transparent electrode 2a so as to cover the portions of the liquid crystal layer in the vicinity of the left sides of the walls 5 as shown in FIG. 6. In other words, the light-shielding film 6 is provided on the downstream sides of the direction of the first imaginary vector with respect to the walls 5.

Next, a method for producing a liquid crystal display device using the ferroelectric liquid crystal having the above-mentioned configuration will be described below.

First, a film made of molybdenum (Mo) or the like for shielding a light is formed on the substrate 1a made of glass or the like. By patterning this film by a photolithography technique, the light-shielding film 6 is formed.

Next, a film made of indium tin oxide (ITO) or the like for a transparent electrode is produced. By patterning this film by a photolithography technique or the like, a plurality of strip-shape transparent electrodes 2a are formed.

Then a layer made of $SiO_2$ for an insulating wall is stacked thereon so as to be 1.5 μm thick. By patterning this layer by a photolithography technique so as to form a predetermined pattern, the walls 5 are formed.

Subsequently, the insulating film 3a made of $SiO_2$ or the like and an alignment film 4a made of polyimide or the like are formed by a coating method or the like on the substrate 1a under this state, and then the alignment film 4a is subjected to a rubbing treatment. The rubbing treatment may be performed in an arbitrary manner. The rubbing treatment is performed in a desired pretilt direction.

Next, a film made of indium tin oxide (ITO) or the like for a transparent electrode is formed on the other substrate 1b made of glass or the like. By patterning this film by a photolithography technique or the like, a plurality of strip-shape transparent electrodes 2b are formed.

Then, an insulating film 3b made of $SiO_2$ or the like is formed thereon, and an alignment film 4b made of polyimide or the like is formed thereon by a coating method or the like and then subjected to a rubbing treatment. The fabrication order of these substrates 1a and 1b may be reversed.

Finally, a ferroelectric liquid crystal material is placed on the substrate 1a having the above-mentioned configuration. Keeping an appropriate temperature, the other substrate 1b is attached to the substrate 1a on which the ferroelectric liquid crystal material is placed so that the rubbing directions of the two substrates 1a and 1b are parallel to each other.

In the ferroelectric liquid crystal display device thus produced, as shown in FIG. 6, even if a zigzag defect, one of the orientational defects of the liquid crystal, is generated, the diamond-shaped layers Y formed in the vicinity of the walls 5 in the ferroelectric liquid crystal layer 7 increases the shock-resistance while suppressing the reduction of the aperture ratio to a minimal level, because the diamond-shaped layers Y are covered with the light-shielding film 6 on the upper side thereof. The light-shielding film 6 prevents light beams from passing through the diamond-shaped layers and deteriorating the display characteristics. In addition, satisfactory orientation without any defects may be obtained in the aperture portions (display portion).

EXAMPLE 2

Figure 7:
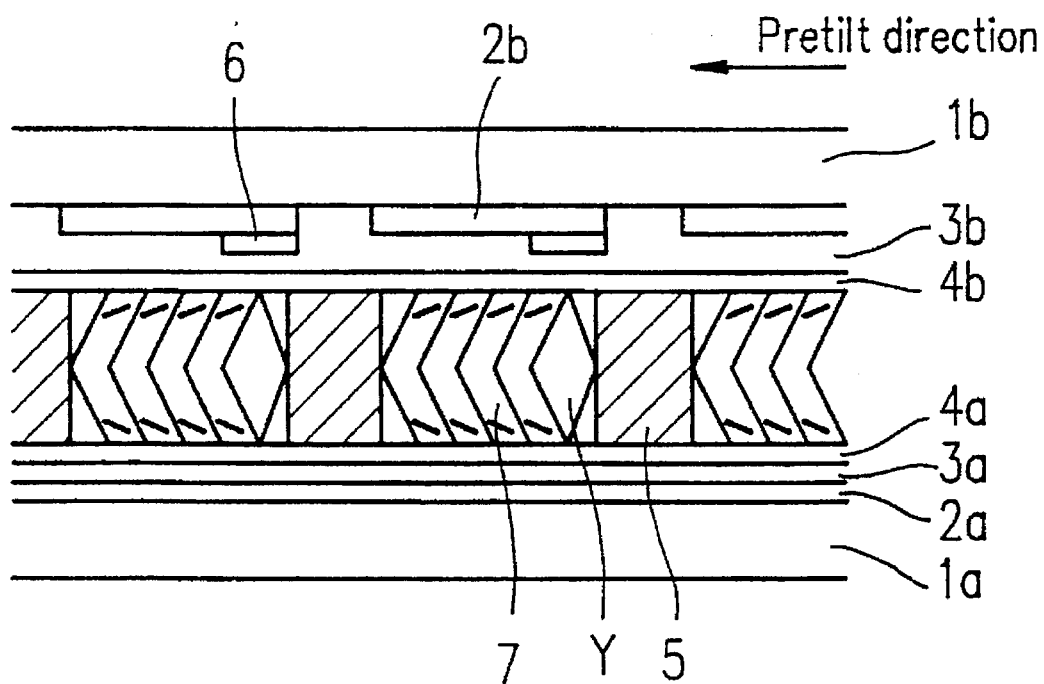
FIG. 7 is a cross-sectional view showing a ferroelectric liquid crystal display device according to another example of the present invention.

FIG. 7 is a cross-sectional view showing a ferroelectric liquid crystal display device according to a second example of the present invention. In this liquid crystal display device, the substrates are disposed at the positions opposite to those of the substrates shown in FIG. 6. That is to say, the substrate 1b is disposed on the upper side, and the substrate 1a is disposed on the lower side. The FLCD shown in FIG. 7 has the same structure as that of the FLCD shown in FIG. 6, except that the light-shielding film 6 is provided on the upper substrate 1b.

A method for producing a liquid crystal display device having the above-mentioned configuration will be described below.

First, a film made of indium tin oxide (ITO) or the like for a transparent electrode is produced on the substrate 1a made of glass or the like. By patterning this film by a photolithography technique or the like, a plurality of strip-shape transparent electrodes 2a are formed.

Subsequently, the insulating film 3a made of $SiO_2$ or the like is stacked thereon and an alignment film 4a made of polyimide or the like is formed thereon by a coating method or the like, and then the alignment film 4a is subjected to a rubbing treatment.

Next, the walls 5 made of a photoresist including spacers having a diameter of 1.5 μm are applied to the entire surface of the substrate 1a. The photoresist film is exposed to light through a photomask, and then developed so as to obtain a predetermined pattern. In performing the exposure and the development, if the photoresist is made non-transmissive by including a black dye or the like in the photoresist, the non-pixel porions are suitably shielded from the light.

Subsequently, a film made of indium tin oxide (ITO) or the like for a transparent electrode is formed on the other substrate 1b made of glass or the like. By patterning this film by a photolithography technique or the like, a plurality of strip-shape transparent electrodes 2b are formed.

Next, a film made of molybdenum (Mo) or the like for shielding the light is formed. By patterning this film by a photolithography technique, a light-shielding film 6 is formed.

Then, an insulating film 3b made of $SiO_2$ or the like is formed thereon, and an alignment film 4b made of polyimide or the like is formed thereon by a coating method or the like and then subjected to a rubbing treatment. The fabrication order of these substrates 1a and 1b may be reversed.

Finally, a ferroelectric liquid crystal material is placed on the substrate 1a having the above-mentioned configuration. Keeping an appropriate temperature, the other substrate 1b is attached to the substrate 1a on which the ferroelectric liquid crystal material is placed so that the rubbing directions of the two substrates 1a and 1b are parallel to each other, thereby obtaining a liquid crystal cell as shown in FIG. 7.

In an ferroelectric liquid crystal display device thus produced, as shown in FIG. 7, even if a zigzag defect, one of the orientational defects of the liquid crystal, is generated, the diamond-shaped layers Y formed in the vicinity of the walls 5 in the ferroelectric liquid crystal layer 7 increases the shock-resistance while suppressing the reduction of the aperture ratio to a minimal level, because the diamond-shaped layers Y are covered with the light-shielding film 6 on the upper side thereof.

EXAMPLE 3

Figure 8A:
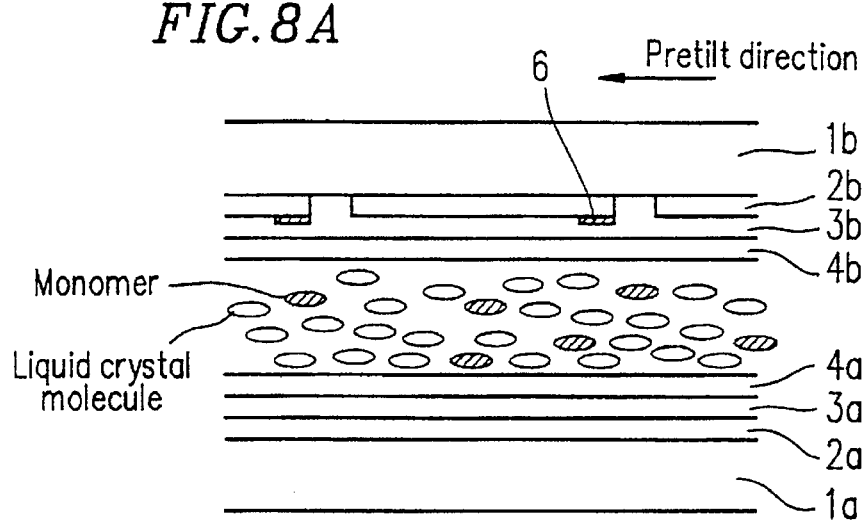
FIGS. 8A to 8C are cross-sectional views illustrating a method for producing the walls according to another example of the present invention.
Figure 8B:
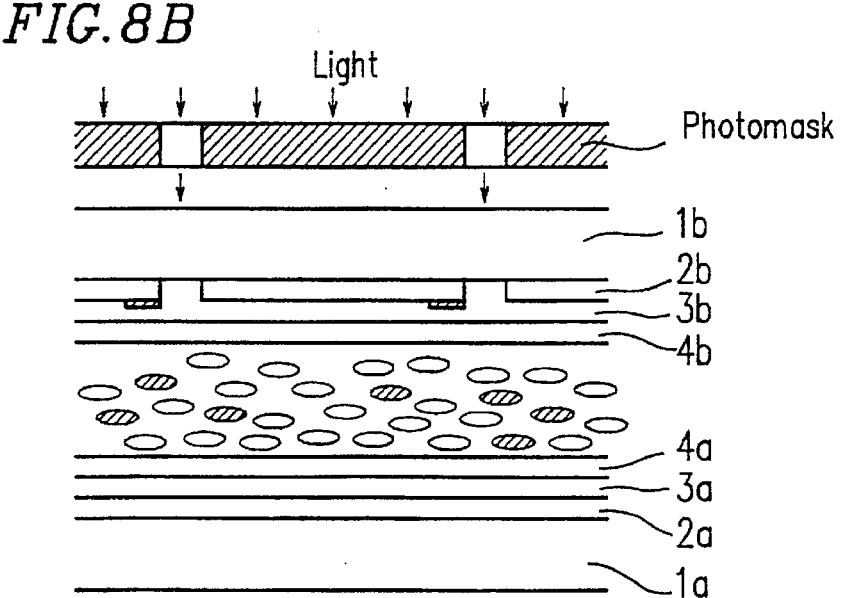
Figure 8C:
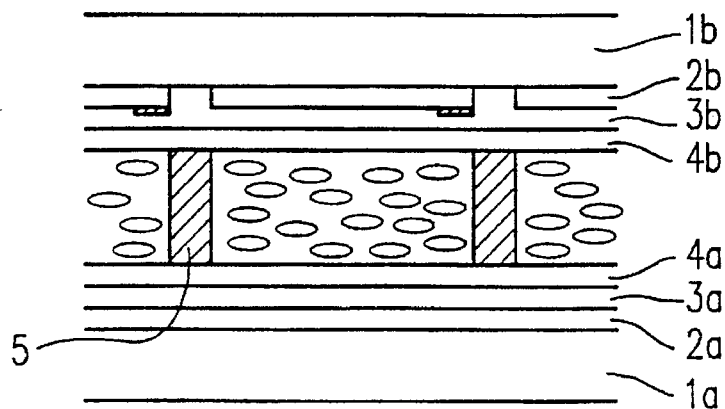
Figure 9:
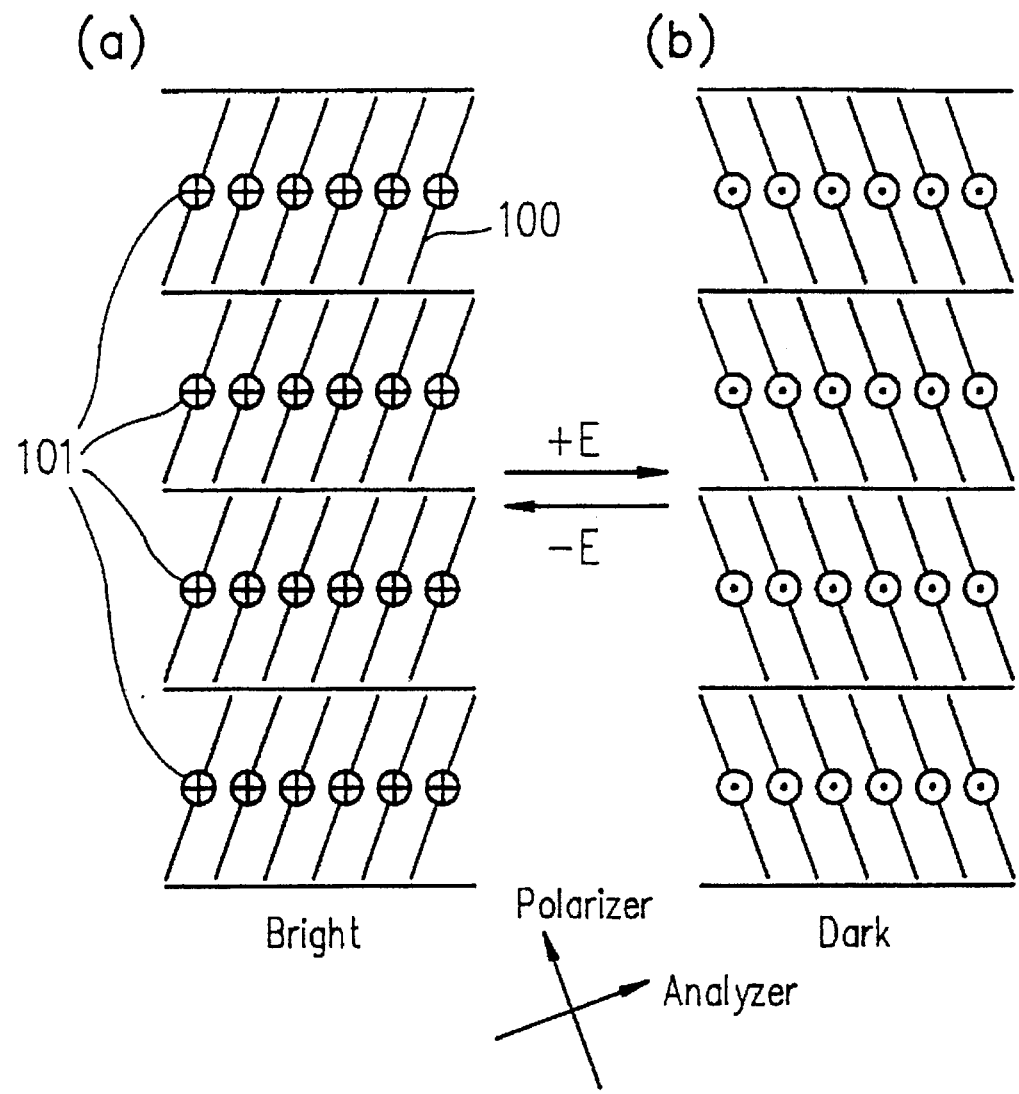
FIGS. 9(a) and 9(b) are schematic views illustrating the operational principles of a ferroelectric liquid crystal display device.
Figure 10A:
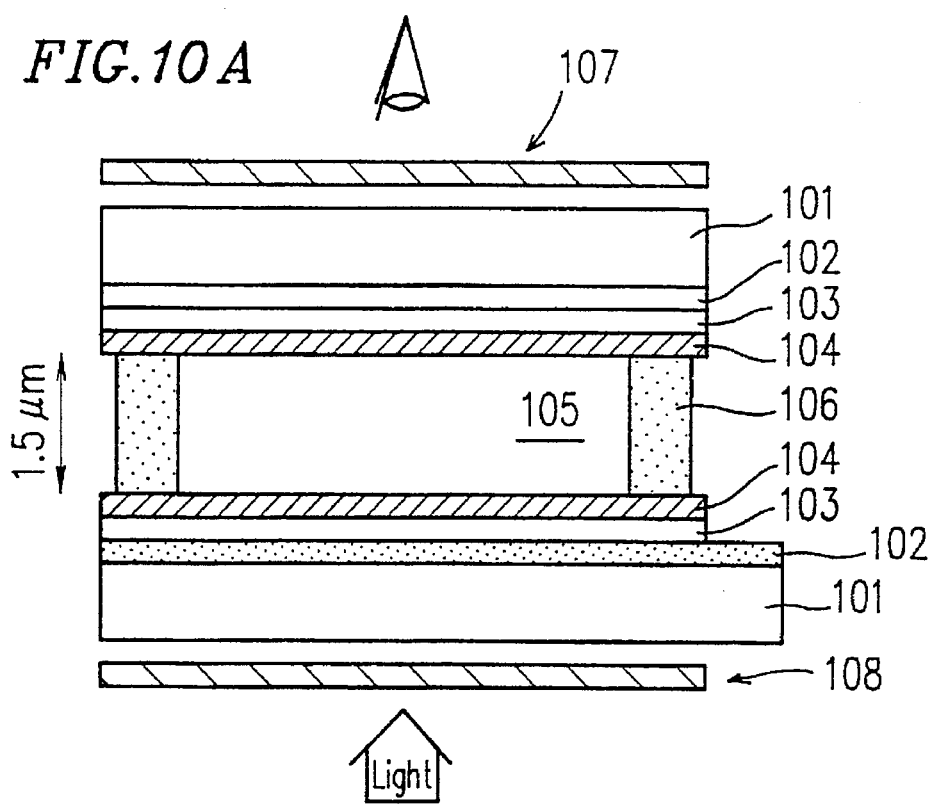
FIG. 10A is a cross-sectional view showing an exemplary liquid crystal display device using a ferroelectric liquid crystal.
Figure 10B:
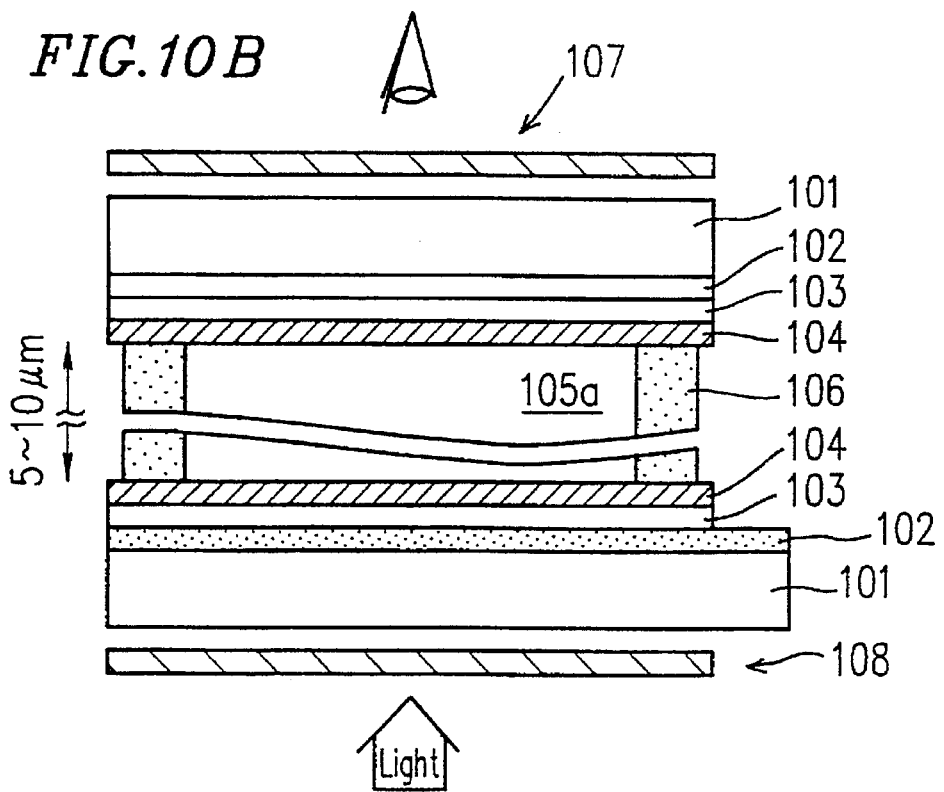
FIG. 10B is a cross-sectional view showing a conventional simple-matrix type liquid crystal display device.

FIGS. 8A to 8C are cross-sectional views illustrating a method for producing the walls according to a third example of the present invention. This FLCD has the same structure as the FLCD described referring to FIG. 7. However, the walls 5 are produced by a different method.

The method for producing a liquid crystal display device having the above-mentioned configuration will be described below.

First, as shown in FIG. 8A, a film made of indium tin oxide (ITO) or the like for a transparent electrode is produced on the substrate 1a made of glass or the like. By patterning this film by a photolithography technique or the like, a plurality of strip-shape transparent electrodes 2a are formed.

Subsequently, the insulating film 3a made of $SiO_2$ or the like is stacked thereon and an alignment film 4a made of polyimide or the like is formed by a coating method or the like, and then the alignment film 4a is subjected to a rubbing treatment.

Then, a film made of indium tin oxide (ITO) or the like for a transparent electrode is formed on the other substrate 1b made of glass or the like. By patterning this film by a photolithography technique or the like, a plurality of strip-shape transparent electrode 2b are formed.

Next, a film made of molybdenum (Mo) or the like for shielding the light is formed. By patterning this film by a photolithography technique, a light-shielding film 6 is formed.

Then, an insulating film 3b made of $SiO_2$ or the like is formed thereon, and an alignment film 4b made of polyimide or the like is formed by a coating method or the like and then subjected to a rubbing treatment.

Subsequently, the substrate 1a is attached to the other substrate 1b with a cell gap set to be 2 μm so that the rubbing directions of the two substrates 1a and 1b are parallel to each other. Into the gap between the two substrates 1a and 1b, a mixture containing a ferroelectric liquid crystal material, a photopolymerizable monomer and a polymerization initiator are injected. The polymerization initiator may be omitted.

Next, as shown in FIG. 8B, the mixture is irradiated with the light through a photomask. As a result, as shown in FIG. 8C, a liquid crystal cell in which the walls 5 are formed on the irradiated portions and the ferroelectric liquid crystal material remains in the non-irradiated portions may be obtained.

In the ferroelectric liquid crystal display device thus produced, even if a zigzag defect, one of the orientational defects of the liquid crystal, is generated, the diamond-shaped layers (not shown) formed in the vicinity of the walls 5 in the ferroelectric liquid crystal layer increases the shock-resistance while suppressing the reduction of the aperture ratio to a minimal level, because the diamond-shaped layers are covered with the light-shielding film 6 on the upper side thereof.

In this third example, the walls 5 are formed so as to surround the four sides of the pixels. However, the present invention is not limited thereto, but the walls 5 may be formed so as to surround the one, two or three sides of the pixels. In this case, the light-shielding film is preferably formed so as to cover the liquid crystal portions on the downstream sides of the walls along the pretilt direction. The light-shielding film may be provided on both of the substrates, or on either one of the substrates. The light-shielding film may prevent light beams from entering or exiting through the orientational defects.

In the above-mentioned examples, the characteristics of the ferroelectric liquid crystal have not been described specifically. However, according to the present invention, it is preferable to use a ferroelectric liquid crystal material having a negative dielectric anisotropy and showing minimal values in the curve showing the relationship between the memory pulse width and the voltage ($\tau$-$V_{min}$), as shown in FIG. 3. In the case of using this ferroelectric liquid crystal material, a fast writing speed, a high contrast and a wide operational temperature range may be advantageously obtained. It is noted that the present invention is not limited to the C2U orientation, but that other orientational states such as the C1U orientation may also be used.

As has been described in detail above, according to the present invention, the orientational defects are generated only in the vicinity of the downstream side of walls along the pretilt direction and the light-shielding film is formed only on the portions where the orientational defects are generated. As a result, the reduction of the aperture ratio may be suppressed to a minimal level. In addition, the existence of the walls may increase the shock resistance. Consequently, it is possible to obtain a ferroelectric liquid crystal display device which enables a high-contrast bright display and increases the shock resistance.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising: a pair of substrates disposed so as to face each other; a pair of electrodes formed respectively on each surface of the pair of substrates; a pair of alignment films formed respectively on each surface of the pair of electrodes; and a ferroelectric liquid crystal layer interposed between the pair of alignment films, wherein pretilt directions defined by first direction vectors obtained by orthogonally projecting first imaginary vectors to each surface of the pair of substrates are the same with respect to both of the pair of substrates, the first imaginary vectors are parallel to liquid crystal molecules in the ferroelectric liquid crystal layer in the vicinity of the pair of substrates and directed away from each surface of the pair of substrates toward a center portion of the ferroelectric liquid crystal layer in its thickness direction, wherein the ferroelectric liquid crystal layer has a plurality of smectic layers in a chevron layered structure and where a bending direction of the smectic layers is the same direction as the first direction vector and is defined by a second direction vector obtained by orthogonally projecting a second imaginary vector to each surface of the pair of substrates, the second imaginary vector is parallel to the smectic layers and included in the same plane with the first imaginary vector and directed away from each of the surfaces of the pair of the substrates toward the center portion of the ferroelectric liquid crystal layer, and wherein walls made of an insulating non-liquid crystal material are formed between the pair of substrates in a direction vertical to the surfaces of the pair of substrates, and a light-shielding film is formed on either one of the pair of substrates so that light beam does not pass through portions of the ferroelectric liquid crystal in a vicinity of a downstream side of the walls along the pretilt direction.

2. A liquid crystal display device according to claim 1, wherein a liquid crystal material of the ferroelectric liquid crystal layer has a negative dielectric anisotropy and shows minimal values in a voltage-memory pulse width curve.

3. A method for producing a type of the liquid crystal display device defined by claim 1, comprising the steps of:

injecting a mixture containing a photopolymerizable monomer and a ferroelectric liquid crystal material into a gap between a pair of substrates disposed so as face each other; and irradiating the mixture with light through a photomask having a predetermined opening pattern, thereby forming insulating polymer walls within light-irradiated portions.

* * * * *